(12) United States Patent
Arai

(10) Patent No.: US 11,391,696 B2
(45) Date of Patent: Jul. 19, 2022

(54) MICROCHIP ELECTROPHORESIS APPARATUS AND MICROCHIP ELECTROPHORESIS METHOD

(71) Applicant: SHIMADZU CORPORATION, Kyoto (JP)

(72) Inventor: Akihiro Arai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 181 days.

(21) Appl. No.: 16/745,447

(22) Filed: Jan. 17, 2020

(65) Prior Publication Data
US 2020/0256830 A1    Aug. 13, 2020

(30) Foreign Application Priority Data
Feb. 8, 2019   (JP) .............................. JP2019-021174

(51) Int. Cl.
*G01N 27/447*    (2006.01)

(52) U.S. Cl.
CPC . *G01N 27/44791* (2013.01); *G01N 27/44743* (2013.01); *G01N 27/44773* (2013.01); *G01N 27/4473* (2013.01)

(58) Field of Classification Search
None
See application file for complete search history.

(56) References Cited

U.S. PATENT DOCUMENTS

| | | |
|---|---|---|
| 2004/0003997 A1 | 1/2004 | Anazawa et al. |
| 2008/0317639 A1 | 12/2008 | Shimoda et al. |
| 2013/0160530 A1 | 6/2013 | Zuppiger |

FOREIGN PATENT DOCUMENTS

| | | |
|---|---|---|
| JP | 2000-121650 A | 4/2000 |
| JP | 2001-124736 A | 5/2001 |

(Continued)

OTHER PUBLICATIONS

Office Action dated May 7, 2022 in Chinese Application No. 202010079411.X.

(Continued)

*Primary Examiner* — J. Christopher Ball
(74) *Attorney, Agent, or Firm* — Sughrue Mion, PLLC

(57) ABSTRACT

A microchip electrophoresis apparatus includes a microchip, a dispensing part, a suction part, and a control part. The control part is configured to perform a buffer solution filling step and a liquid surface aligning step. In the buffer solution filling step, a buffer solution is filled in a channel of the microchip, and also a liquid surface level of the buffer solution in a first reservoir and a liquid surface level of the buffer solution in a second reservoir provided on the other end of the channel are set to a predetermined level or more. The liquid surface aligning step is performed after the buffer solution filling step. In the liquid surface aligning step, tips of a first suction nozzle and a second suction nozzle are lowered from above the first reservoir and the second reservoir to the predetermined level while allowing the first suction nozzle and the second suction nozzle to perform suction operation, such that the buffer solution in the first reservoir and the second reservoir is sucked in order from a surface layer side, and aligning the liquid surface level of the first reservoir with the liquid surface level of the second reservoir.

4 Claims, 8 Drawing Sheets

(56) References Cited

FOREIGN PATENT DOCUMENTS

| | | | |
|---|---|---|---|
| JP | 2002-125694 A | | 5/2002 |
| JP | 2009-2816 A | | 1/2009 |
| JP | 2011-013045 A | | 1/2011 |
| JP | 2012-242128 A | | 12/2012 |
| JP | 2013-134254 A | | 7/2013 |
| JP | 2016-024021 A | | 2/2016 |
| JP | 2017-161233 A | | 9/2017 |
| JP | 2017161233 A | * | 9/2017 |

OTHER PUBLICATIONS

Office Action dated May 10, 2022 in Japanese Application No. 2019-021174.

* cited by examiner

MICROCHIP ELECTROPHORESIS APPARATUS AND MICROCHIP ELECTROPHORESIS METHOD

BACKGROUND OF THE INVENTION

1. Field of the Invention

The present invention relates to a microchip electrophoresis apparatus and a microchip electrophoresis method.

2. Description of the Related Art

Microchip electrophoresis has a feature that separation detection can be performed at high speed by downsizing lengths of a separation channel and a sample plug which are provided in a microchip to minimum necessary lengths, and by performing electrophoresis using a relatively low viscosity solution.

Reservoirs whose upper parts are open are provided at a position corresponding to a channel end part of the microchip. At the time of electrophoresis analysis, the separation channel is filled with a buffer solution for electrophoresis, and a predetermined amount of buffer solution is dispensed into the reservoirs at the channel end part. However, because flow resistance is small due to the short channel length and the buffer solution has low viscosity, if a level of the buffer solution in each of the reservoirs differs from the others, a hydrodynamic flow is generated in the channel due to a siphonic phenomenon. This affects mobility and separation performance of sample components during electrophoretic analysis. Therefore, prior to the electrophoretic analysis, it is necessary to align a liquid surface level of the buffer solution in each of the reservoirs.

SUMMARY OF THE INVENTION

In the conventional microchip electrophoresis, it is common to align the liquid surface level of the buffer solution in each of the reservoirs by injecting the buffer solution under pressure from a specific reservoir of the microchip into the channel to fill the channel with the buffer solution, and then sucking the buffer solution remaining in each of the reservoirs by a suction nozzle to empty each of the reservoirs, and thereafter, dispensing a specified amount of buffer solution into each of the reservoirs. (See JP 2017-161233 A).

However, when the buffer solution in each of the reservoirs is sucked after the buffer solution is filled in the channel, there is a concern that the buffer solution in the reservoir remains unsucked. The unsucked buffer solution in the reservoir causes an error in the liquid surface level in the reservoir. The causes of the unsucked buffer solution in the reservoir include a positional relationship between the suction nozzle and the reservoir (relative position where a nozzle tip comes into contact with a reservoir bottom surface, and an angle between a nozzle end surface and a contact surface), a malfunction of a suction pump, and the like. Furthermore, accuracy of a dispensing amount of the buffer solution into the reservoir after the buffer solution is sucked from each of the reservoirs also affects the liquid surface level of each of the reservoirs.

Accordingly, an object of the present invention is to improve the accuracy of controlling the liquid surface level in each of the reservoirs after the channel in the microchip is filled with the buffer solution.

A microchip electrophoresis apparatus according to the present invention includes a microchip, a dispensing part, a suction part, and a control part. The microchip is provided with a channel inside. The channel has a first end and a second end, and the microchip comprises a first reservoir opening upward at the first end of the channel and a second reservoir opening upward at the second end of the channel. The dispensing part has a dispensing probe configured to be connected to the first reservoir in a liquid-tight manner, and discharges the buffer solution from a tip of the dispensing probe. The suction part has a first suction nozzle, a second suction nozzle and a moving mechanism for moving the first suction nozzle and the second suction nozzle. The suction part is configured to suck a liquid in the first reservoir from a tip of the first suction nozzle and to suck a liquid in the second reservoir from a tip of the second suction nozzle. The control part controls operation of the dispensing part and the suction part. The control part is configured to perform a buffer solution filling step and to perform a liquid surface aligning step after the buffer solution filling step. The buffer solution filling step is a step in which the buffer solution is filled in the channel so that liquid surface levels of the buffer solution in the first reservoir and the second reservoir reach to a predetermined level or more. The liquid surface aligning step is a step in which the liquid surface level of the first reservoir and the liquid surface level of the second reservoir are aligned with each other by lowering the tips of the first suction nozzle and the second suction nozzle from above the first reservoir and the second reservoir to the predetermined level while causing the first suction nozzle and the second suction nozzle to perform suction operation, in such a way that the buffer solution in the first reservoir and the second reservoir is sucked in order from a surface layer side.

A microchip electrophoresis method according to the present invention includes the following steps. The microchip electrophoresis method includes: a buffer solution filling step of filling the buffer solution in the channel so that liquid surface levels of the buffer solution in the first reservoir and the second reservoir to a predetermined level or more; and a liquid surface aligning step of, after the buffer solution filling step is completed, aligning the liquid surface level of the first reservoir and the liquid surface level of the second reservoir with each other by lowering tips of the first suction nozzle and the second suction nozzle that are configured to suck the buffer solution in the first reservoir and the second reservoir respectively, from above the first reservoir and the second reservoir to the predetermined level while causing the first suction nozzle and the second suction nozzle to perform suction operation, in such a way that the buffer solution in the first reservoir and the second reservoir is sucked in order from a surface layer side.

That is, in the present invention, when the buffer solution is filled in the channel of the microchip, the liquid surface levels of the buffer solution in the first reservoir and the second reservoir reach to the predetermined level or more, and then, the buffer solution in the first reservoir and the second reservoir is sucked in order from the surface layer side by the first suction nozzle and the second suction nozzle, and the respective liquid surface levels are aligned with each other in the predetermined level. As a result, the accuracy of the liquid surface level of the buffer solution in each of the reservoirs depends only on the accuracy of a level at which the tips of the first suction nozzle and the second suction nozzle are lowered. Accordingly, there is no need to consider the unsucked buffer solution and dispensing accuracy in each of the reservoirs.

In the present invention, "sucking the buffer solution in order from the surface layer side" means that the suction nozzle is lowered while performing the suction operation and sucking air at the predetermined level. This is because if the suction is performed while a liquid surface is in contact with a nozzle cross section by surface tension, or the suction is performed after the suction nozzle is lowered to a predetermined level and the nozzle tip is inserted into the buffer solution, the buffer solution is sucked more than necessary, and the liquid surface level of the buffer solution after the suction may become lower than the predetermined level. In the present invention, because the liquid surface level in each of the reservoirs is intended to depend only on the lowering level of the suction nozzle, it is important that only the buffer solution be sucked at a surface layer part where the tip of the suction nozzle is in contact without being affected by the viscosity of the buffer solution and the surface tension of the nozzle. Further, it is desirable that operation of the suction nozzle to assist the suction of air be used in combination.

In the microchip electrophoresis apparatus according to the present invention, in the buffer solution filling step, the control part may be configured to discharge the buffer solution from the tip of the dispensing probe while connecting the dispensing probe with the first reservoir in the liquid-tight manner in a state in which no liquid exists in the channel.

In the microchip electrophoresis method according to the present invention, in the buffer solution filling step, the buffer solution may be filled in the channel by connecting in the liquid-tight manner to the first reservoir, the dispensing probe that discharges the buffer solution, in a state in which no liquid is present in the channel of the microchip.

In one embodiment of the microchip electrophoresis apparatus according to the present invention, in the liquid surface aligning step, the control part is configured to temporarily stop lowering the first suction nozzle and the second suction nozzle immediately after the tips of the first suction nozzle and the second suction nozzle have sucked the surface layer part of the buffer solution in the first reservoir and the second reservoir. As a result, the suction nozzle is prevented from being lowered before the surface layer part of the buffer solution in each of the reservoirs is sucked by the suction nozzle, and accordingly, only the surface layer part of the buffer solution where the tip of the suction nozzle is in contact with can be sucked by the suction nozzle.

In one embodiment of the microchip electrophoresis method according to the present invention, in the liquid surface aligning step, the first suction nozzle and the second suction nozzle are temporarily stopped from being lowered immediately after the tips of the first suction nozzle and the second suction nozzle have sucked the surface layer part of the buffer solution in the first reservoir and the second reservoir. As a result, the suction nozzle is prevented from being lowered before the surface layer part of the buffer solution in each of the reservoirs is sucked by the suction nozzle, and accordingly, only the surface layer part of the buffer solution where the tip of the suction nozzle is in contact with can be sucked by the suction nozzle.

In the above-described embodiment of the microchip electrophoresis apparatus according to the present invention, in the liquid surface aligning step, the control part may be configured to temporarily raise the first suction nozzle and the second suction nozzle immediately after the tips of the first suction nozzle and the second suction nozzle have sucked the surface layer part of the buffer solution in the first reservoir and the second reservoir. As a result, the buffer solution can be reliably prevented from being sucked by the suction nozzle more than necessary after the surface layer part of the buffer solution in each of the reservoirs is sucked by the suction nozzle.

In the above-described embodiment of the microchip electrophoresis method according to the present invention, in the liquid surface aligning step, the first suction nozzle and the second suction nozzle may be temporarily raised immediately after the tips of the first suction nozzle and the second suction nozzle have sucked the surface layer part of the buffer solution in the first reservoir and the second reservoir. As a result, the buffer solution can be reliably prevented from being sucked by the suction nozzle more than necessary after the surface layer part of the buffer solution in each of the reservoirs is sucked by the suction nozzle.

In the microchip electrophoresis apparatus and the microchip electrophoresis method according to the present invention, when the buffer solution is filled in the channel of the microchip, the liquid surface levels of the buffer solution in the first reservoir and the second reservoir reach to the predetermined level or more, and thereafter, the buffer solution in the first reservoir and the second reservoir is sucked in order from the surface layer side by the first suction nozzle and the second suction nozzle to align the respective liquid levels with each other in the predetermined liquid level. Accordingly, the accuracy of the liquid surface level of the buffer solution in each of the reservoirs depends only on the lowering accuracy of the tips of the first suction nozzle and the second suction nozzle, and the accuracy of controlling the liquid surface level in each of the reservoirs is improved.

DETAILED DESCRIPTION OF THE INVENTION

Hereinafter, an embodiment of a microchip electrophoresis apparatus and a microchip electrophoresis method is described with reference to the drawings.

Figure 1:
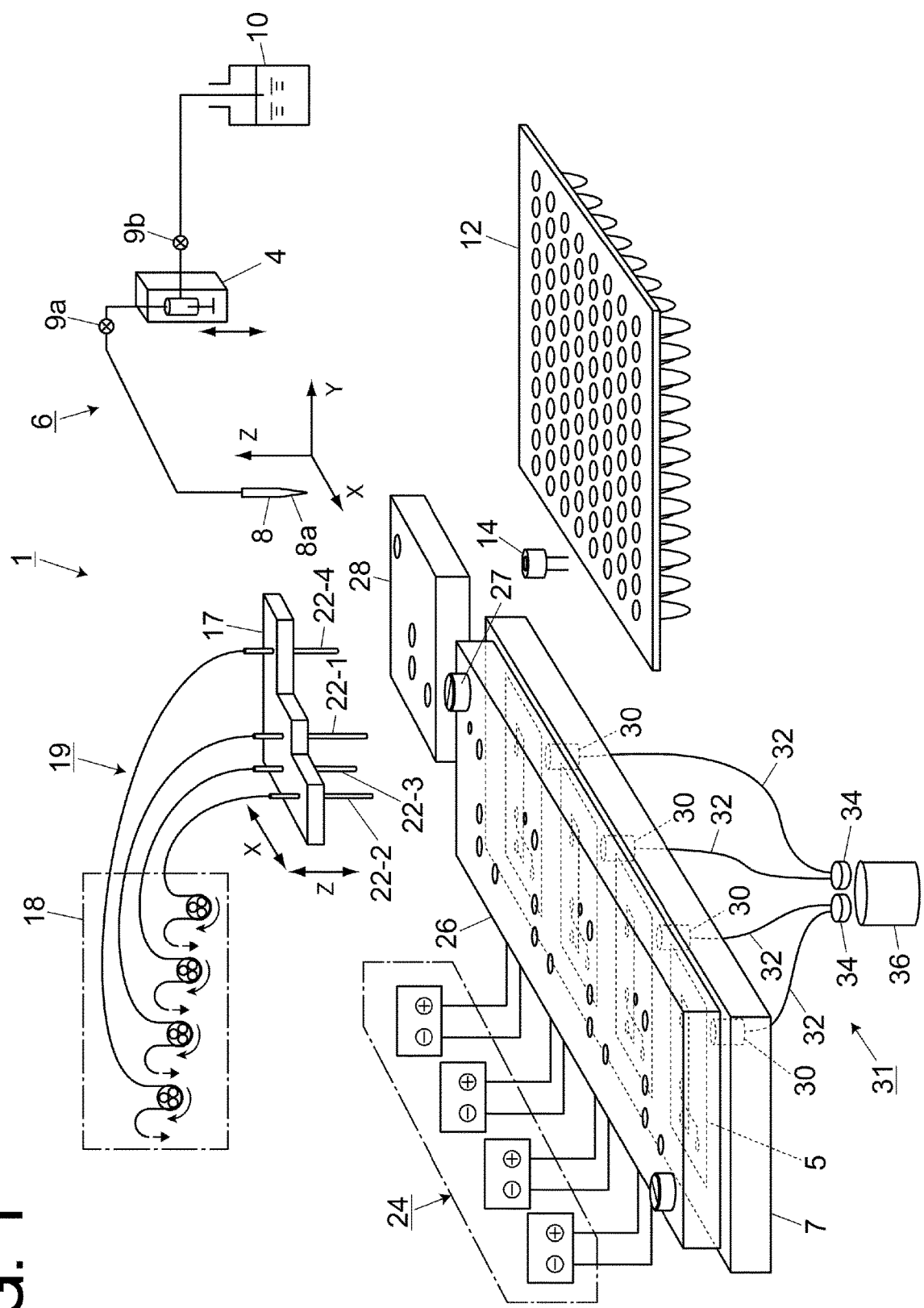
FIG. 1 is a perspective view schematically showing one embodiment of a microchip electrophoresis apparatus.
Figure 2:
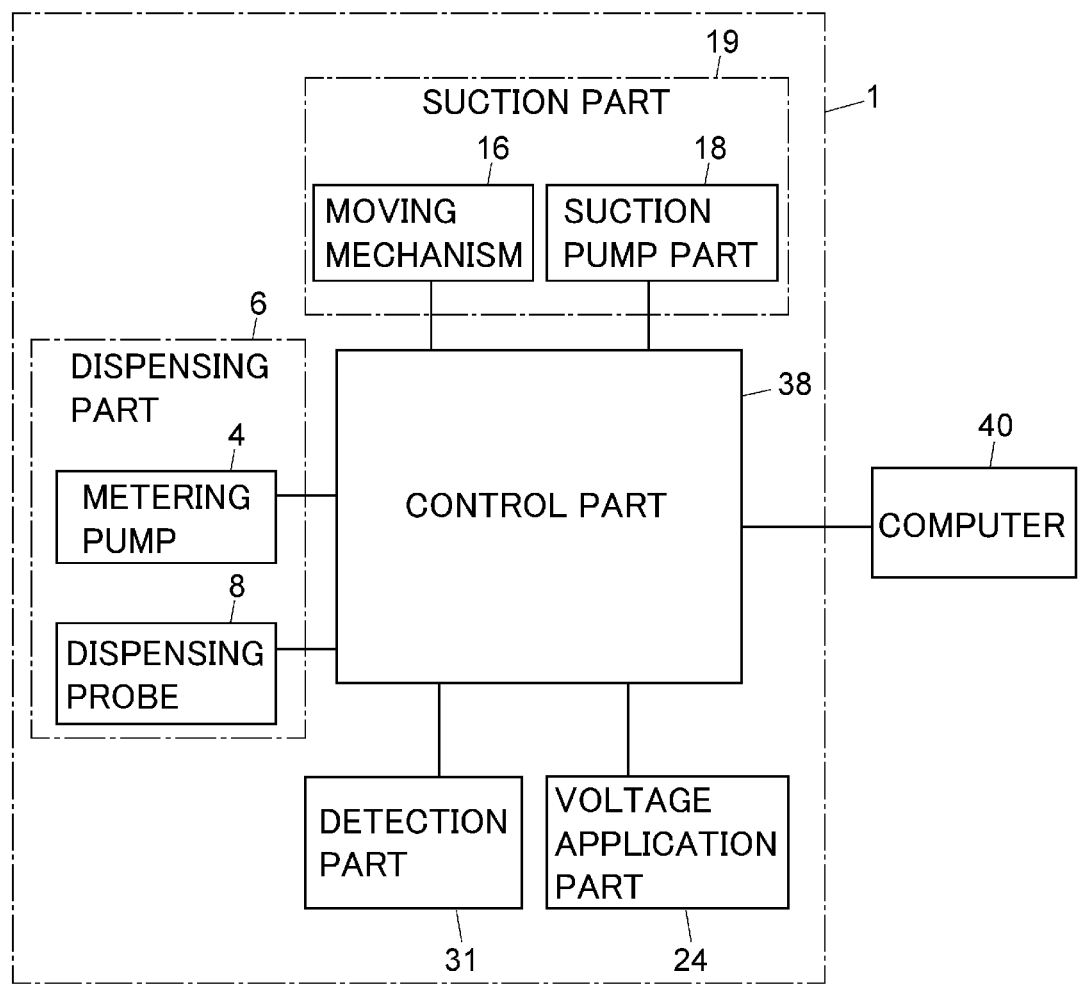
FIG. 2 is a block diagram schematically showing a control system of the same embodiment.

As shown in FIGS. 1 and 2, a microchip electrophoresis apparatus 1 mainly includes microchips 5, a dispensing part 6, a chip holding part 7, a suction part 19, a voltage application part 24, a detection part 31, and a control part 38. The microchips 5 are arranged on the chip holding part 7. In this embodiment, four microchips 5 are arranged on the chip holding part 7, but the number of microchips 5 is not limited. In FIG. 1, an expansion reservoir block 26 is arranged on the microchips 5, but the expansion reservoir block 26 is not an essential component.

In addition to a metering pump 4 and a dispensing probe 8, the dispensing part 6 includes a moving mechanism (not shown) that moves the dispensing probe 8 three-dimensionally in the horizontal direction (XY direction) and the vertical direction (Z direction). The dispensing probe 8 is connected to the metering pump 4 via an opening/closing valve 9a. The metering pump 4 is connected to a cleaning liquid container 10 via an opening/closing valve 9b.

The suction part 19 includes suction nozzles 22-1 to 22-4 provided corresponding to each of the reservoirs of the microchips 5, a nozzle holding part 17 that holds the suction nozzles 22-1 to 22-4, a suction pump part 18 having suction pumps each of which is connected to each of the suction nozzles 22-1 to 22-4 via tubes, and further includes a moving mechanism that moves the nozzle holding part 17 in the horizontal plane direction and the vertical direction. The suction nozzles 22-2 to 22-4 are held such that levels of tips thereof are substantially equal to each other, and the suction nozzle 22-1 is held such that a tip thereof is lower than the tips of the suction nozzles 22-2 to 22-4. (It is designed that a difference between the above levels is higher than a level of a reservoir 53-1.)

The voltage application part 24 applies, for each microchip 5, an independent electrophoresis voltage to each channel end of the microchip 5.

The detection part 31 detects, for example, fluorescence of a sample component separated in a separation channel in the microchip 5. For example, for each microchip 5, the detection part 31 includes a light emitting diode (LED) 30 that irradiates a part of the separation channel with excitation light, and an optical fiber 32 that receives the fluorescence generated by the sample component moving in the separation channel being excited by the excitation light from the LED 30. The detection part 31 includes a photomultiplier tube 36 that receives fluorescence through a filter 34 that removes an excitation light component from the fluorescence from the optical fiber 32 and transmits only a fluorescence component.

In addition, the microchip electrophoresis apparatus 1 includes a probe cleaning part 14 for cleaning the dispensing probe 8 and a nozzle cleaning part 28 for cleaning the suction nozzles 22-1 to 22-4. Reference numeral 12 denotes a well plate having plural wells storing a sample, a reagent, a separating polymer, and the like, and is arranged within a movement range of the dispensing probe 8. Note that the reagent and the separating polymer may be accommodated in a container different from the well plate 12 and arranged within the movement range of the dispensing probe 8.

The control part 38 controls the operations of the dispensing part 6, the suction part 19, the voltage application part 24, and the detection part 31. The control part 38 is realized by, for example, an electronic circuit equipped with a central processing unit (CPU), a storage device, and the like. The control part 38 is connected to a computer 40 provided outside the microchip electrophoresis apparatus 1.

The computer 40 is realized by, for example, a personal computer (PC) or a dedicated computer. The computer 40 is an external control device for instructing the operation of the microchip electrophoresis apparatus 1 and for capturing and processing data obtained by the detection part 31.

Figure 3:
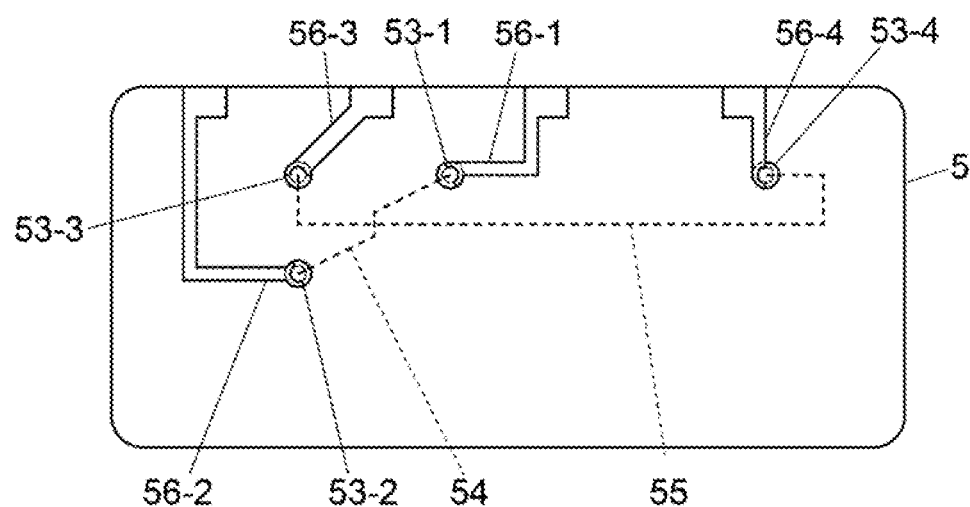
FIG. 3 is a plan view showing an example of a microchip.

As shown in FIG. 3, the microchip 5 includes channels 54 and 55 inside. The channels 54 and 55 each have a first end and a second end. The first end and the second end of the channel 54 are respectively provided with reservoirs 53-1 and 53-2 opening upward, and the first end and the second end of the channel 55 are provided with reservoirs 53-3 and 53-4 opening upward. The microchip 5 is provided with electrode terminals 56-3 to 56-4 for facilitating electrical access to solutions in the respective reservoirs 53-1 to 53-4. The electrode terminals 56-3 to 56-4 are electrically connected to the voltage application part 24 (see FIG. 1).

Figure 4:
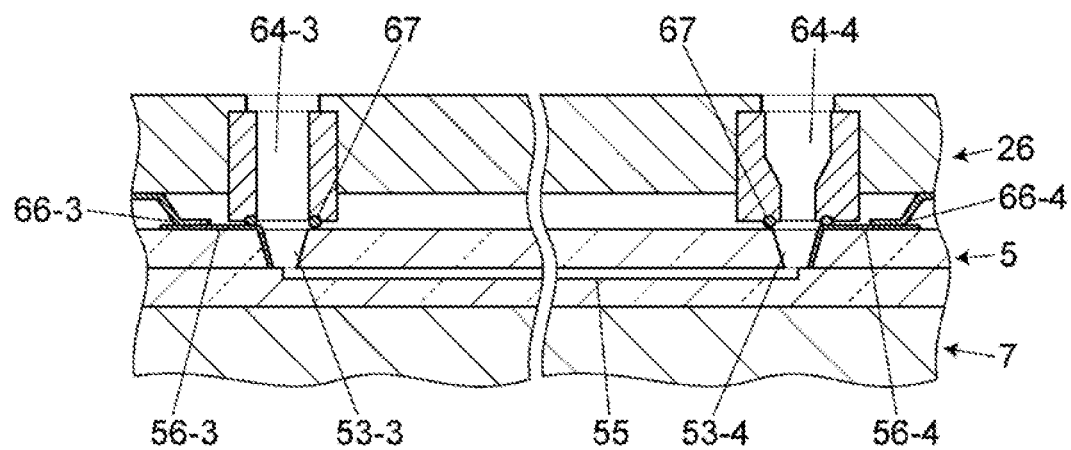
FIG. 4 is a diagram showing a cross-sectional structure of a microchip on which an expansion reservoir block is mounted.

FIG. 4 shows a cross-sectional structure of the microchip to which the expansion reservoir block 26 is attached on the chip holding part 7. In FIG. 4, only the cross-sectional structure at positions of the reservoirs 53-3 and 53-4 is shown because the cross-sectional structure along the channel 55 is shown, but the cross-sectional structure at positions of the reservoirs 53-1 and 53-2 is the same as the cross-sectional structure at the position of the reservoir 53-3.

The expansion reservoir block 26 arranged on the microchip 5 includes through holes 64-3 to 64-4 at positions corresponding to the reservoirs 53-1 to 53-4 of the microchip 5. Each of the through holes 64-3 to 64-4 is communicated in a liquid-tight manner with each of the reservoirs 53-1 to 53-4 by a sealing member 67 such as an O-ring. With this configuration, a capacity of each of the reservoirs 53-1 to 53-4 is expanded by each of the through holes 64-3 to 64-4, and a large-capacity reservoir is realized.

Figure 7:
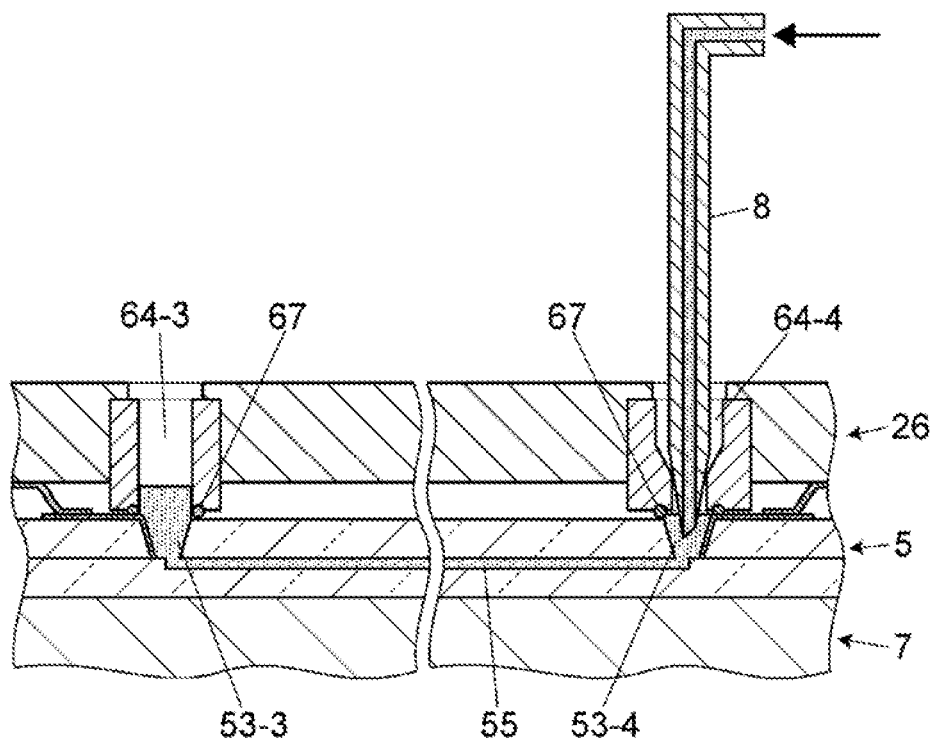
FIG. 7 is a cross-sectional view showing a state during a buffer solution filling step in the same embodiment.

An inner surface of the through hole 64-4 of the expansion reservoir block 26 is provided with a tapered portion whose inner diameter decreases toward a lower side, such that the dispensing probe 8 can be connected to the reservoir 53-4 in a liquid-tight manner (see FIG. 7). That is, the reservoir 53-4 forms a first reservoir provided at the first end of the channel 55 inside the microchip 5 and connected to the dispensing probe 8 in a liquid-tight manner, and the reservoir 53-3 forms a second reservoir provided at the second end of the channel 55.

On the lower surface of the expansion reservoir block 26, electrode contacts 66-3 to 66-4 are provided which are electrically connected to electrode terminals 56-3 to 56-4 of the microchip 5. The electrode contacts 66-3 to 66-4 are connected to the voltage application part 24 through electrical wiring (see FIG. 1).

An example of the operation of the microchip electrophoresis apparatus 1 is described with reference to FIGS. 7 to 10 together with the flowcharts of FIGS. 5 and 6.

Figure 5:
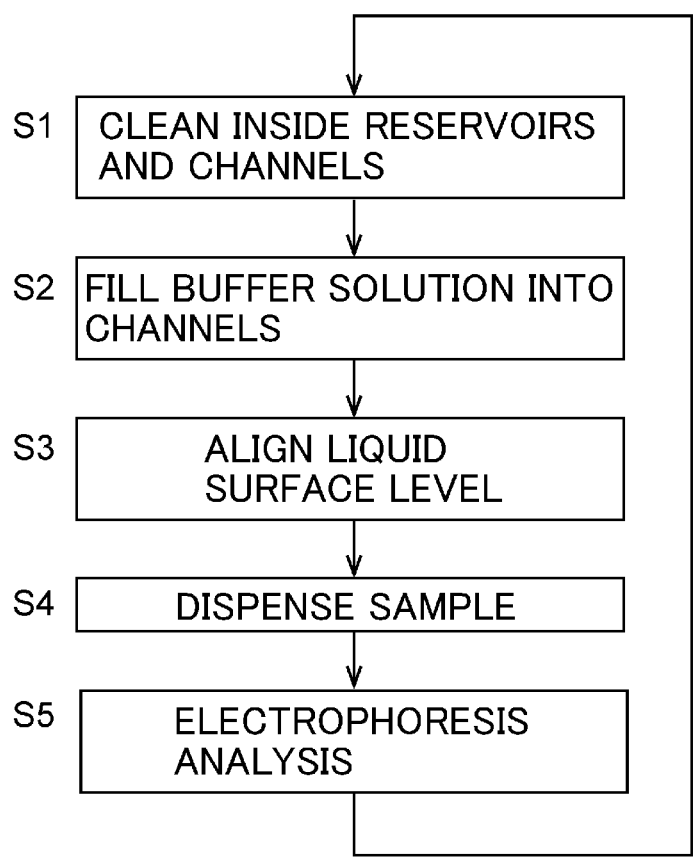
FIG. 5 is a flowchart showing an example of operation of the same embodiment.

In the microchip electrophoresis apparatus 1, the microchips 5 are repeatedly used in a state of being fixed to the chip holding part 7 without being moved, and an operations flow before reaching the electrophoresis analysis is shown in FIG. 5.

Figure 8:
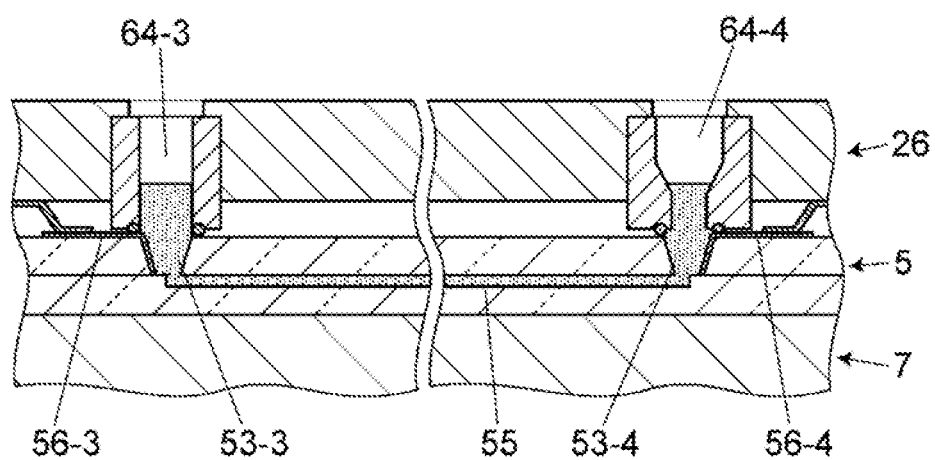
FIG. 8 is a cross-sectional view showing a state after the buffer solution filling step in the same embodiment.
Figure 9:
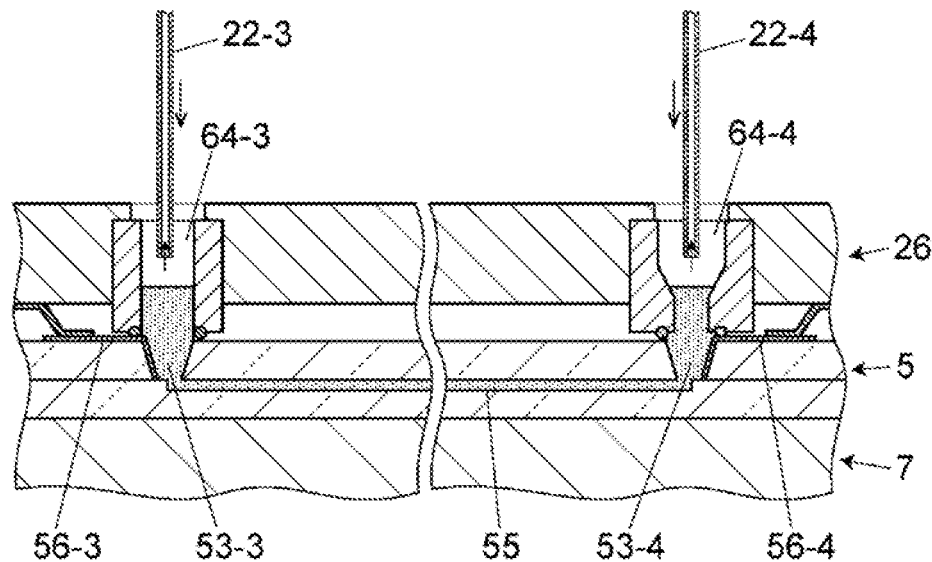
FIG. 9 is a cross-sectional view showing a state when suction nozzles are lowered in the liquid surface aligning step of the same embodiment.
Figure 10:
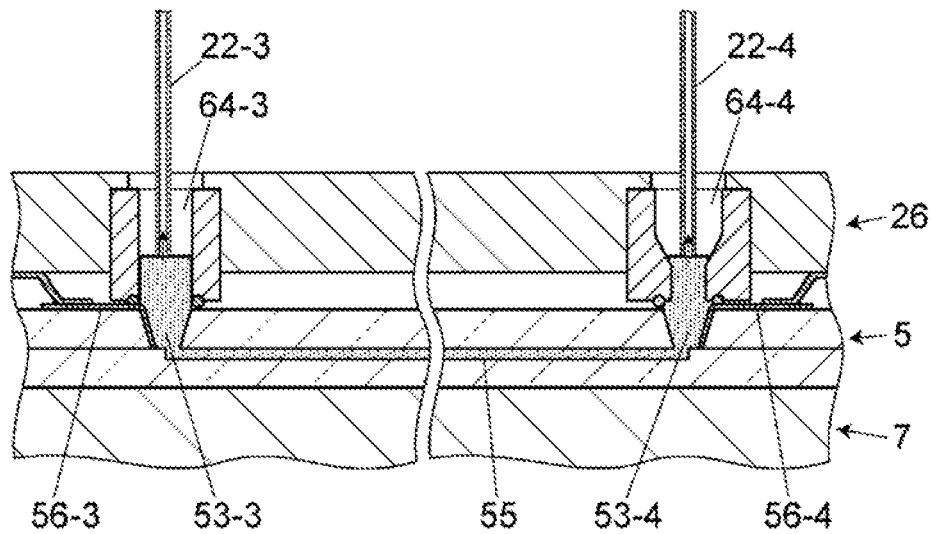
FIG. 10 is a cross-sectional view showing a state when a surface layer part of the buffer solution is sucked in the liquid surface aligning step of the same embodiment.

First, prior to the electrophoretic analysis, each of the reservoirs 53-1 to 53-4 and the channels 54 and 55 of the microchip 5 is cleaned (step S1). A detailed description of the cleaning is omitted. Thereafter, a buffer solution filling step into the channels 54 and 55 of the microchip 5 is performed (step S2). In the buffer solution filling step, as shown in FIG. 7, the dispensing probe 8 is connected in a liquid-tight manner to the reservoir 53-4, the buffer solution is discharged from the dispensing probe 8, and the buffer solution is filled in the channels 54 and 55. At this time, an excessive amount of buffer solution exceeding an internal volume of the channels 54 and 55 is supplied from the dispensing probe 8, and as shown in FIG. 8, the liquid level of the buffer solution in each of the reservoirs 53-1 to 53-4 is set higher than a predetermined level.

After the above buffer solution filling step is completed, a liquid surface aligning step is performed in which the liquid surface levels in the reservoirs 53-2 to 53-4 are aligned to substantially the same level (step S3). In the liquid surface aligning step, the tips of the suction nozzles 22-2 to 22-4 are moved from above the reservoirs 53-1 to 53-4 to a predetermined level while the suction nozzles 22-1 to 22-4 is made to perform the suction operation. Thereafter, the buffer solution in the suction nozzles 22-2 to 22-4 is sucked in order from the surface layer part. Because levels of the tips of the suction nozzles 22-2 to 22-4 are substantially the same, by lowering the tips of the suction nozzles 22-2 to 22-4 to the predetermined level while making the suction nozzles 22-2 to 22-4 perform the suction operation, the liquid surface levels of the reservoirs 53-2 to 53-4 are aligned to the predetermined level.

The tip of the suction nozzle 22-1 is designed to reach a bottom surface of the reservoir 53-1 before the tips of the suction nozzles 22-2 to 22-4 reach the predetermined level, accordingly, all of the buffer solution in the reservoir 53-1 is sucked by the suction nozzle 22-1 in the liquid surface aligning step. In order to avoid a risk of the suction nozzle 22-1 also sucking the buffer solution from the reservoirs 53-2 to 53-4 depending on a viscosity of the buffer solution, the suction nozzles 22-2 to 22-4 may be first lowered while performing suction to thereby align the liquid surface of the reservoirs 53-2 to 53-4, and thereafter, the buffer solution only in the reservoir 53-1 may be sucked immediately before the suction nozzle 22-1 dispenses the sample.

After the liquid surface aligning step, a predetermined amount of sample is dispensed into the empty reservoir 53-1 (step S4), and electrophoretic analysis is performed (step S5).

Figure 6:
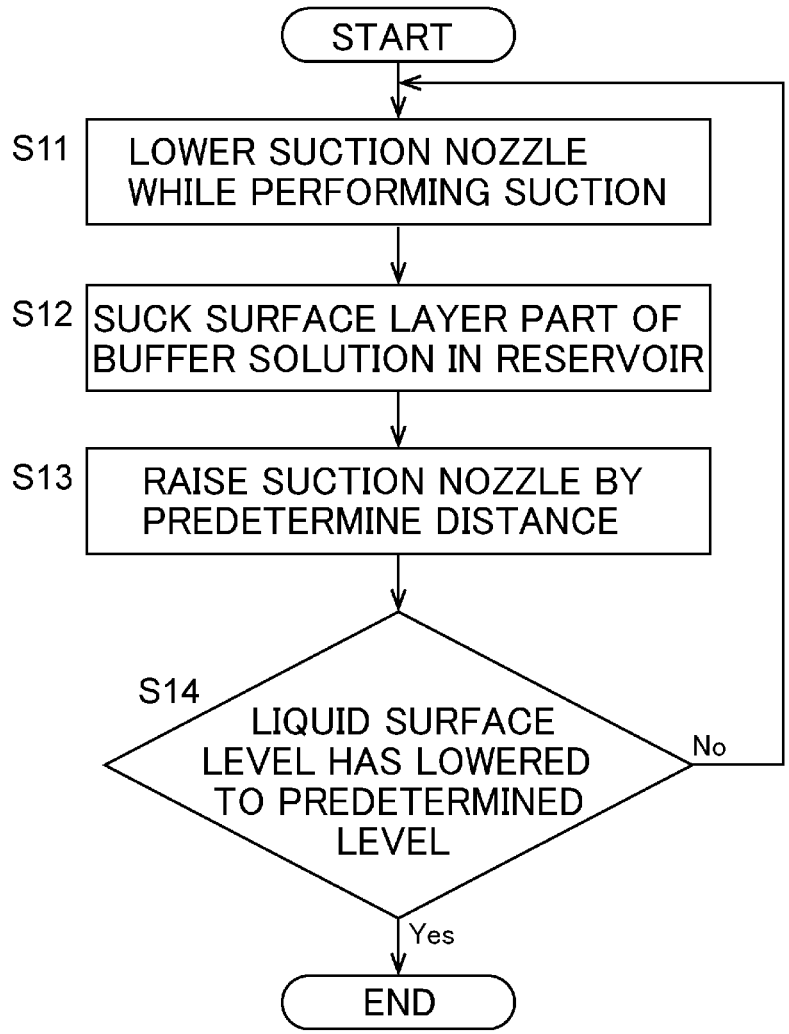
FIG. 6 is a flowchart showing an example of operation in a liquid surface aligning step of the same embodiment.
Figure 11:
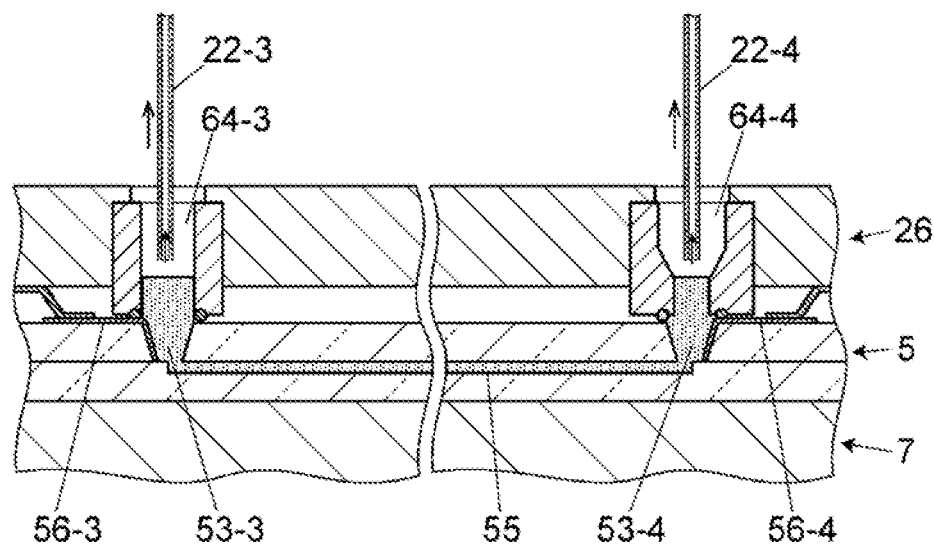
FIG. 11 is a cross-sectional view showing a state immediately after the surface layer part of the buffer solution is sucked in the liquid surface aligning step of the same embodiment.
Figure 12:
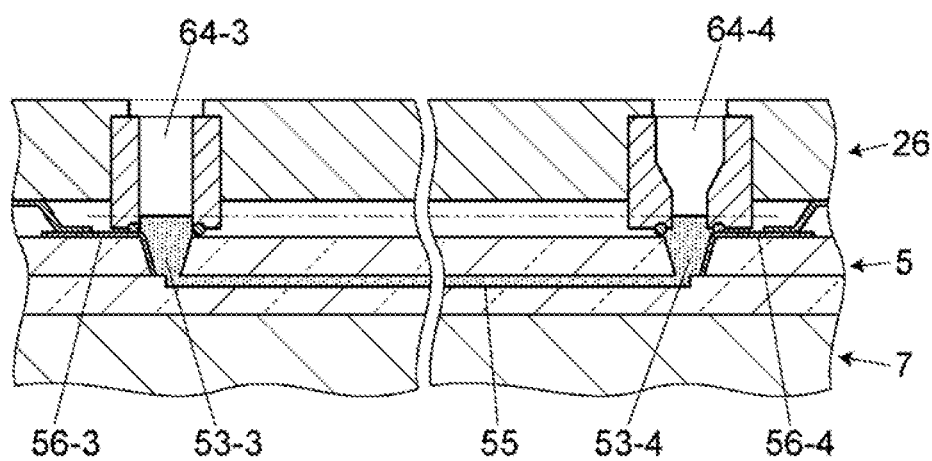
FIG. 12 is a cross-sectional view showing a state after the liquid surface aligning step in the same embodiment.

In addition, as shown in FIG. 6, in the liquid surface aligning step, the operations are repeatedly performed in which the tips of the suction nozzles 22-2 to 22-4 are lowered while the suction nozzles 22-2 to 22-4 are made to perform the suction operation (see step S11, FIG. 9), only the surface layer part of the buffer solution in the reservoirs 53-2 to 53-4 are sucked with the suction nozzles 22-2 to 22-4 (see step S12, FIG. 10), and immediately thereafter, the nozzles 22-2 to 22-4 are raised by a certain distance (see step S13, FIG. 11), until the liquid surface level of the buffer solution in each of the reservoirs 53-2 to 53-4 becomes the predetermined level (see step S14, FIG. 12). By the above operations, it is possible to prevent the buffer solution in each of the reservoirs 53-2 to 53-4 from being sucked more than necessary by the suction nozzles 22-2 to 22-4, and accordingly, the liquid surface level of the buffer solution in each of the reservoirs 53-2 to 53-4 can be accurately adjusted to the predetermined level.

As described above, in the microchip electrophoresis apparatus 1 according to this embodiment, because the liquid levels of the buffer solution in the reservoirs 53-3 and 53-4 (first reservoir and second reservoir) provided at both ends of the channel 55 of the microchip 5 only depend on the accuracy of level positions of the tips of the nozzles 22-3 and 22-4, there is no need to consider the unsucked buffer solution and dispensing accuracy of the buffer solution in the reservoirs 53-3 and 53-4. For this reason, it is possible to improve the aligning accuracy of the liquid surface level of the reservoirs 53-3 and 53-4 at the anode end and the cathode end of the channel 55 being at least the electrophoresis channel, as compared with the prior art. Accordingly, the reproducibility of the analysis is improved.

DESCRIPTION OF REFERENCE SIGNS

1 Microchip electrophoresis apparatus
5 Microchip
6 Dispensing part
7 Chip holding part
8 Dispensing probe
19 Suction part
22-1 to 22-4 Suction nozzle
26 Expansion reservoir block
38 Control part
54, 55 Channel
53-1 to 53-4 Reservoir
64-3 to 64-4 Through hole
67 Elastic member

What is claimed is:

1. A microchip electrophoresis method using a microchip in which a channel having a first end and a second end is provided inside, the microchip comprises a first reservoir opening upward at the first end of the channel and a second reservoir opening upward at the second end of the channel, the method comprises:
   a buffer solution filling step of filling a buffer solution in the channel so that liquid surface levels of the buffer solution in the first reservoir and the second reservoir reach to a predetermined level or more; and
   a liquid surface aligning step of, after the buffer solution filling step is completed, aligning the liquid surface level of the first reservoir and the liquid surface level of the second reservoir with each other by lowering tips of the first suction nozzle and the second suction nozzle that are configured to suck the buffer solution in the first reservoir and the second reservoir, respectively, from above the first reservoir and the second reservoir to the predetermined level while causing the first suction nozzle and the second suction nozzle to perform suction operation, in such a way that the buffer solution in the first reservoir and the second reservoir is sucked in order from a surface layer side.

2. The microchip electrophoresis method according to claim 1, wherein, in the buffer solution filling step, the buffer solution is discharged from the tip of the dispensing probe while connecting the dispensing probe to the first reservoir in a liquid-tight manner in a state in which no liquid is present in the channel of the microchip.

3. The microchip electrophoresis method according to claim 1, wherein, in the liquid surface aligning step, the first suction nozzle and the second suction nozzle are temporarily stopped lowering immediately after the tips of the first suction nozzle and the second suction nozzle have sucked a surface layer part of the buffer solution in the first reservoir and the second reservoir.

4. The microchip electrophoresis method according to claim 3, wherein, in the liquid surface aligning step, the first suction nozzle and the second suction nozzle are temporarily raised immediately after the tips of the first suction nozzle and the second suction nozzle have sucked the surface layer part of the buffer solution in the first reservoir and the second reservoir.

* * * * *